United States Patent
Zeh

(10) Patent No.: US 6,614,991 B2
(45) Date of Patent: Sep. 2, 2003

(54) INVERTER-FED THREE-PHASE MOTOR FOR HOUSEHOLD APPLIANCE, ESPECIALLY FOR THE DIRECT DRIVE OF WASHING MACHINES

(75) Inventor: Stefan Zeh, Wangen (DE)

(73) Assignee: Diehl AKO Stiftung & Co. KG, Wangen (DE)

(*) Notice: Subject to any disclaimer, the term of this patent is extended or adjusted under 35 U.S.C. 154(b) by 0 days.

(21) Appl. No.: 09/929,923

(22) Filed: Aug. 15, 2001

(65) Prior Publication Data

US 2001/0051041 A1 Dec. 13, 2001

Related U.S. Application Data

(63) Continuation-in-part of application No. 09/514,720, filed on Feb. 28, 2000.

(30) Foreign Application Priority Data

Mar. 17, 1999 (DE) .......................... 199 11 809

(51) Int. Cl.⁷ .............. H02M 1/12; H02H 7/10; H02P 5/34
(52) U.S. Cl. ................ 388/935; 363/44; 363/50; 318/801
(58) Field of Search .................. 388/935; 318/139, 318/806, 801; 363/34, 37, 39, 40, 44, 47, 50, 52, 55, 56.03, 56.04, 56.07, 56.1; 361/1, 15–17, 23, 24, 30, 31, 33; 174/51

(56) References Cited

U.S. PATENT DOCUMENTS 5,341,075 A * 8/1994 Cocconi ................ 307/66
5,583,385 A * 12/1996 Horie et al. ............ 363/47
6,122,184 A * 9/2000 Enjeti et al. ............ 363/47
6,377,479 B1 * 4/2002 Ayano et al. ........... 307/151
6,421,618 B1 * 7/2002 Kliman et al. .......... 324/500

FOREIGN PATENT DOCUMENTS

| DE | 34 39 894 A1 | 4/1986 | |
|---|---|---|---|
| DE | 198 12 315 A1 | 9/1999 | |
| EP | 371 427 A2 | 6/1990 | |
| EP | 809 346 A1 | 3/1997 | |
| JP | 36795 | 2/1990 | |
| JP | 09037593 | 2/1997 | |
| JP | 10210649 | 8/1998 | |
| JP | 11246571 A * | 8/1999 | H02M/7/48 |

* cited by examiner

*Primary Examiner*—Robert E. Nappi
*Assistant Examiner*—Patrick Miller
(74) *Attorney, Agent, or Firm*—Scully, Scott, Murphy & Presser

(57) ABSTRACT

An inverter-fed three-phase electrical motor (1) for a household appliance is grounded through a protective conductor (8), with the motor being particularly provided for the direct drive of washing machines. The motor includes a pick-up for high-frequency currents originating from an actuation of the inverter (7) and conducts the currents to one pole of a D.C. voltage supply (13) for the inverter (7) through an ohmic or capacitive shunt path (18-19), with the shunt path leading from a stator (3) of the motor which is installed electrically insulated into the household appliance and is not connected to the protective conductor (8).

2 Claims, 4 Drawing Sheets

INVERTER-FED THREE-PHASE MOTOR FOR HOUSEHOLD APPLIANCE, ESPECIALLY FOR THE DIRECT DRIVE OF WASHING MACHINES

CROSS-REFERENCE TO RELATED PATENT APPLICATION

This application is a continuation-in-part application of Ser. No. 09/514,720; filed on Feb. 28, 2000.

BACKGROUND OF THE INVENTION

1. Field of the Invention

The present invention relates to a three-phase motor for a domestic appliance, wherein the motor is fed through an inverter. More particularly, the three-phase motor is utilized for the direct drive of washing machines and other domestic appliances.

In the provisions of drives in domestic or household appliances, the electrical three-phase motor is of increasing interest, in which the rotary field is produced from the household power supply through an intermediate direct current circuit through the intermediary of a high-frequency controlled inverter, which supplies the field windings of the stator with opposite phase shiftings.

In order to be able to attain the smoothest possible running in a household appliance; for instance, when in the case of a centrifugal drier there can be encountered high rotational speeds or considerable imbalances, the motor is regularly built into the housing of the appliance on rubber footings or the like, and through these is thereby electrically insulated with regard to this housing. The motor drives the operative installation of the appliance, such as the drum of a washing machine or drier. For this purpose, there can be provided a belt transmission extending from the rotor of the motor to the drive pulley of this operative installation, so that also in that regard is the motor insulated from the appliance housing.

In the future, a direct drive will increase in significance, in which the rotor is in the form of a pot-shaped or funnel-shaped external rotor, which at its exposed end surface is directly connected with the operative installation, generally such as the washer drum, or is even constructed integrally therewith. Inasmuch as the rotating operative installation is supported within the housing, in such a direct drive there is provided an ohmic (electrical) connection from the rotor across the support with the appliance housing.

Independently thereof, as to whether this connection is provided, or if not (such as with the usual internal rotors with belt drive), the housing due to appropriate safety regulations must be permanently connected to ground potential through a protective conductor.

The field coils of an inverter-controlled three-phase motor do not only carry the impressed rotary field currents, but moreover in comparison to their periodicity, extremely high-frequency currents due to the high-frequent actuation of the bridge circuits in the inverter. These high-frequency currents flow as capacitive shunt or leakage currents across the parasitic capacitances, which are constantly produced between electrically mutually insulated but sufficiently closely neighboring electrically-conductive constructional components; in effect, initially from the insulated field coils onto the exciter sheet packet which is built into the motor housing, and from there then further to the rotor which is spaced therefrom. When this relates to the construction of the above-mentioned external rotor, the high-frequency ohmic currents flow from the rotor across the support thereof to the appliance housing, and then further through the protective conductor which is connected to ground, and the household power supply back into the inverter. This flow of current through the support to the grounded protective conductor adversely influences the function and operating life of the support, and consequently in the interest of obtaining an undisrupted long term operation of the appliance, is extremely undesirable. When the protective conductor is not low-ohmically connected to the appliance housing, or due to a defect is even interrupted, then the housing acts as a large-surfaced radiating antenna for a high-frequency interference radiation; which is not permissible, in any instance, inasmuch as such a massive disruption can no longer be controlled through protective measures available in the circuitry technology, such as a power supply or mains filter. Consequently, when a person touches this housing, then his body due to the insufficient installation of the protective conduit, produces an auxiliary connection to ground potential, so that the body of the person is subjected to an extremely uncomfortable, and eventually even a health-endangering high-frequency current flow.

However, even in the case when the rotor is electrically insulated with regard to the appliance housing, such as in the instance of the internal rotor with belt drive, this can still lead to not negligible high-frequency capacitive shunt or bypass current across the protective conductor; namely from to field windings across the sheetmetal packet in the stator and through the leakage capacitances between the stator or, respectively, the motor housing to the surrounding constructional components of the grounded appliance. This shunt or bypass current is; in effect, not as high as that passing through the bearing construction of an external rotor; however, due to the high ohmic capacitive path from the motor housing to the appliance housing with its protective conductor, the stator sheetmetal packet of the motor now impermissibly radiates interference or leakage radiation as a particularly highly effective antenna.

2. Discussion of the Prior Art

In German Publication DE 34 39 894 A1 (Siemens) there is ascertained the problem that through the leakage capacitances between the stator field coils and the stator sheetmetal packet in the motor housing, capacitative currents flow off to a protective conductor, which is connected to the motor housing. This high frequency interference current circuit closes itself across the control circuit for the inverter, and as a result, threatens the function of the control circuit. In order to reduce this danger, it is proposed therein that the control circuit between the motor housing and the inverter be capacitively bridged over, in effect, conductively for the high frequency, so that the high frequency shunt or bypass current, such as a leakage current, can no longer endanger the control circuit.

However, the foregoing will not prevent that the capacitive shunt current will at all enter the protective conductor, which must also be positively connected to the appliance housing, with the above-mentioned endangerment of persons in the case of an inadequate connection; and the problem that for an external rotor as in the case of the direct drive, the support location for the rotor can be impermissibly loaded or stressed by the shunt or bypass current, is not even recognized in this publication.

In the disclosure of Miyazaki et al. U.S. Pat. No. 6,151,228, with the aid of an inductive transductor in the intermediate current circuit upstream of the inverter, there is effected a quantitative detection of the capacitive shunt or bypass current in the protective conductor, which is connected to a housing in which the motor operates. The transducer controls an amplifier circuit which supplies an oppositely poled current of the same time interval into the protective conductor, and thereby should compensate for the shunt current, so as to avoid an undue influence over the control circuit for the inverter. From the standpoint of circuit technology, this is extremely complex and critical in its manner of functioning through an intended broader working range for the amplifier circuit.

SUMMARY OF THE INVENTION

In accordance with the present invention there is prevented a straining or stressing of the bearing or support for a direct drive-external rotor with an ohmic leakage current to the appliance housing, as well as for an insulatedly-driven internal rotor-equipped motor, in that there is an absence of subjecting the appliance housing to the mentioned leakage current by means of the stray capacitances and in any event every disruptive current flow in the protective conductor is hereby precluded, in that already within the motor there is effected any leakage through the intermediary of circuitry; namely, directly from the stator back to the control of the inverter ahead of the stator field windings.

BRIEF DESCRIPTION OF THE ACCOMPANYING DRAWINGS

For a more detailed disclosure of the invention, reference may now be made to the following detailed description and to the drawings with their representation, on the one hand, without and, on the other hand, with the inventive shunting or bypass of the capacitive disruptive or leakage currents, taken in conjunction with the accompanying drawings; in which.

DETAILED DESCRIPTION OF A PREFERRED EMBODIMENT

Figure 1:
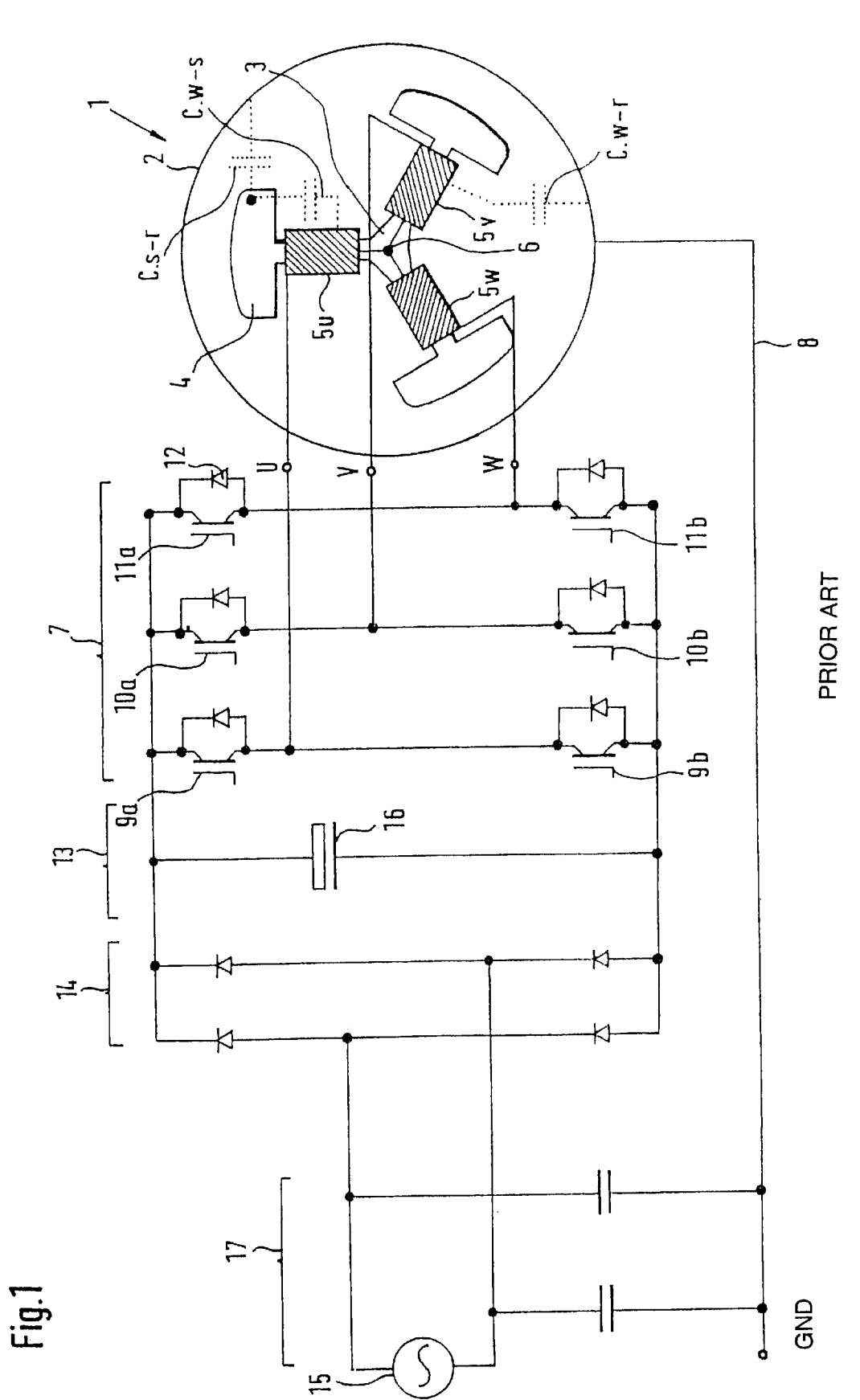
FIG. 1 illustrates a principal schematic circuit diagram for a rectified current-controlled motor with an external rotor in accordance with the state-of-the technology.

The circuit diagrams illustrate as an exemplary embodiment of the invention, a three-phase motor 1 with an external rotor 2 and an inwardly located stator 3 possessing three pole pieces 4 including a three-phase exciter winding 5u, 5v, 5w between the common star point 6 and the motor terminals U, V and W. The housing of the household appliance (for example, a washing machine) in which this motor is installed, is connected to ground potential by means of a protective conductor 8. The rotor 2 supported in the machine framework of the housing and, as a result, due to this support is ohmically located at the potential of the connector to the protective conductor 8.

The rotary field of the stator for the generating of a rotational moment or torque for the rotor 2 is impressed from a controlled inverter 7. Each of the motor connecting terminals U, V and W, is for this purpose, conducted to the center pick-up of the three semiconductor bridge circuits which are associated therewith. These consist presently each of two controlled semiconductor switches 9a/b, 10a/b and 11a/b which are connected in series, with free-running diodes 12 for the inductive switch-off currents of the exciter windings 5u, 5v, 5w. The cyclically time-displaced overlapping sequential activation of the semiconductor switches (in effect, power-switch transistors 9a to 11b) is carried out in accordance with the extent of the rotational field which is to be generated by means of high-frequency base actuations in the magnitude of 20 kHz from a programmed control circuit (not shown), for example, a processor which, in the circuit diagram, is only indicated by the transistor base connections.

The inverter 7 in turn, is supplied from the household alternating-current power supply or mains through a so-called full wave or bridge rectifier 14 with a voltage-smoothing D.C. capacitor 16 in the intermediate circuit 13. A protective power supply or mains filter 17 produces a high-frequency capacitive shortcircuit in each of the two power supply or mains lines leading to the protective conductor 8, so that if at all possible, no high-frequency currents caused by to the actuation of the bridge switches 9, 10, 11 can pass into the household mains 15.

Figure 2:
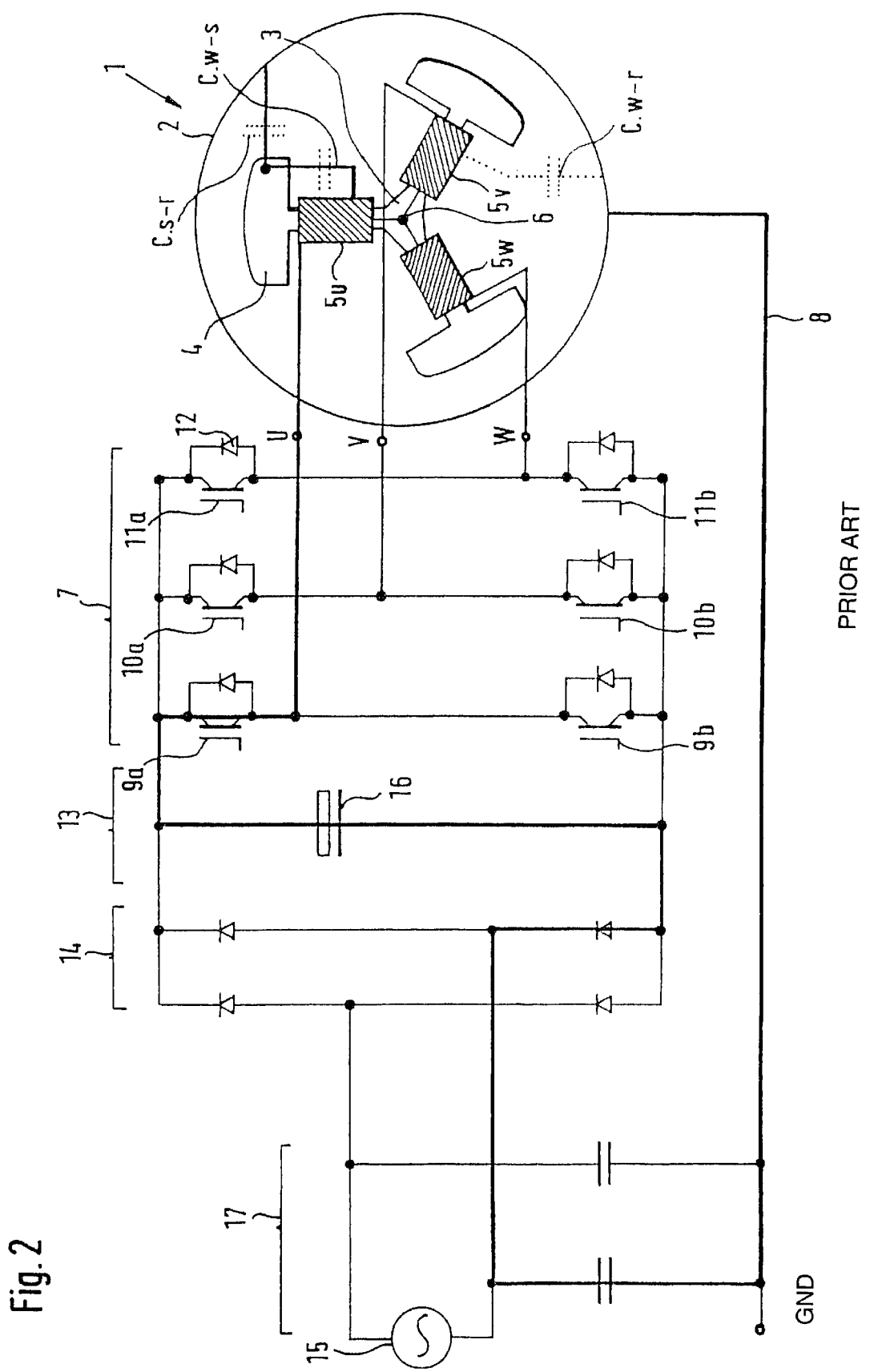
FIG. 2 illustrates the path of the undesired, high-frequency leakage current into the protective conductor in the circuit of FIG. 1.

Because of the spatial proximity among different mutually electrically insulated components of the motor 1, there exist parasitic capacitances C between these components; namely, in particular C.w-s between, on the other hand each of the exciter windings 5u, 5v and 5w and, on the other hand, the stator 3 with its pole pieces 4, C.r-s between the stator 3 and the rotor 2, as well as C.w-r between the exciter windings 5 and the rotor 2. Additionally to the low frequency currents of the rotational field, flowing through the exciter windings 5 are the high-frequency currents which originate from the actuation of the semiconductor switches 9, 10, 11 of the inverter 7, which currents in accordance with FIG. 1 passing through the above-mentioned parasitic capacitances C lead to the rotor 2 and across the support thereof in the machine frame to the therewith connected protective conductor 8, as well (as shown in FIG. 2) through the mains filter 17 and the rectifier 14 with its intermediate circuit 13, back again to the inverter 7. These high-frequency leakage or bypass currents through the rotor support do not only exert disadvantageous effects over the dependability in the functioning of the motor bearing or support, but for household appliances (European Norm 60335) in the interest of protecting persons are not permitted to exceed a specified boundary value. Finally, the energy or power supply and generating concerns prohibit any contamination of their power supply or mains 15 by such disruptive frequencies.

There is even encountered an immediate danger to limb and life of a servicing person when the protective conductor 8 is not low-ohmically grounded from the appliance housing pursuant to official regulations; for example, due to a technical disturbance or problem. This would cause a person, upon touching the household appliance, possibly such as a washing machine, to close the disruptive or leakage current circuit from the exciter windings 5 through his body to the power supply or mains filter 17, in the event when there is concurrently touched a grounded installation, such as water valve or cock. The consequence thereof would be that this person would be subjected to the danger of an uncomfortable or even dangerous high-frequency current flow through his body.

Inventively, however, there is met a measure which prevents that any kind of high frequency shunt or leakage current can in a significant intensity pass to the machine housing, and in any event can lead into the protective conductor 8.

Figure 3:
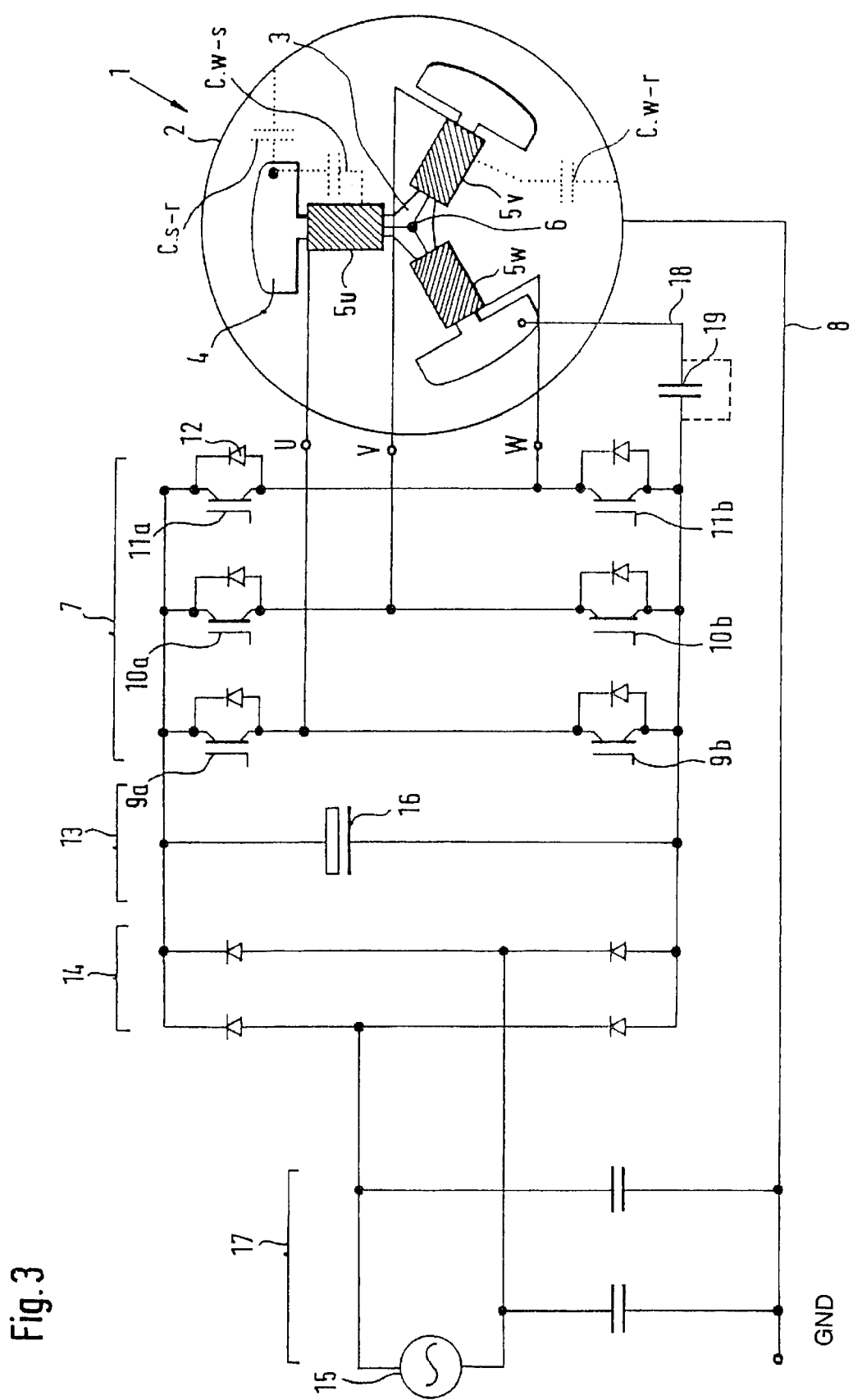
FIG. 3 illustrates the inventive supplement to the circuit of FIG. 1.

This is attained by means of the embodiment as shown in FIG. 3, in that already the stator 3 is single-connected with the intermediate circuit 13, so that the high-frequency shunt or leakage currents need no longer flow off through the machine housing and the protective conductor 8. This short bypass or leakage path 18, which connects within the motor 1, as shown in phantom lines, is conducted directly ohmically or, however, from a potential standpoint, softly (capacitively) to the intermediate circuit 13; namely, through a steady-voltage capacitor 19 which does not form any mentionable resistance to the high-frequency shunt or leakage currents, but rather affords a low potential contact protection from the stator 3 to the lower-frequency mains voltage. Consequently, this ensures that the critical, high frequency currents will close their current circuit directly to the inverter 7; in effect, need not to any significant extent flow through the additional closing connection of the housing and the protective conductor 8, and consequently, even at a disruption or breakdown in the protective conductor connection, will not allow for the formation of any critical potentials on the machine housing.

Figure 4:
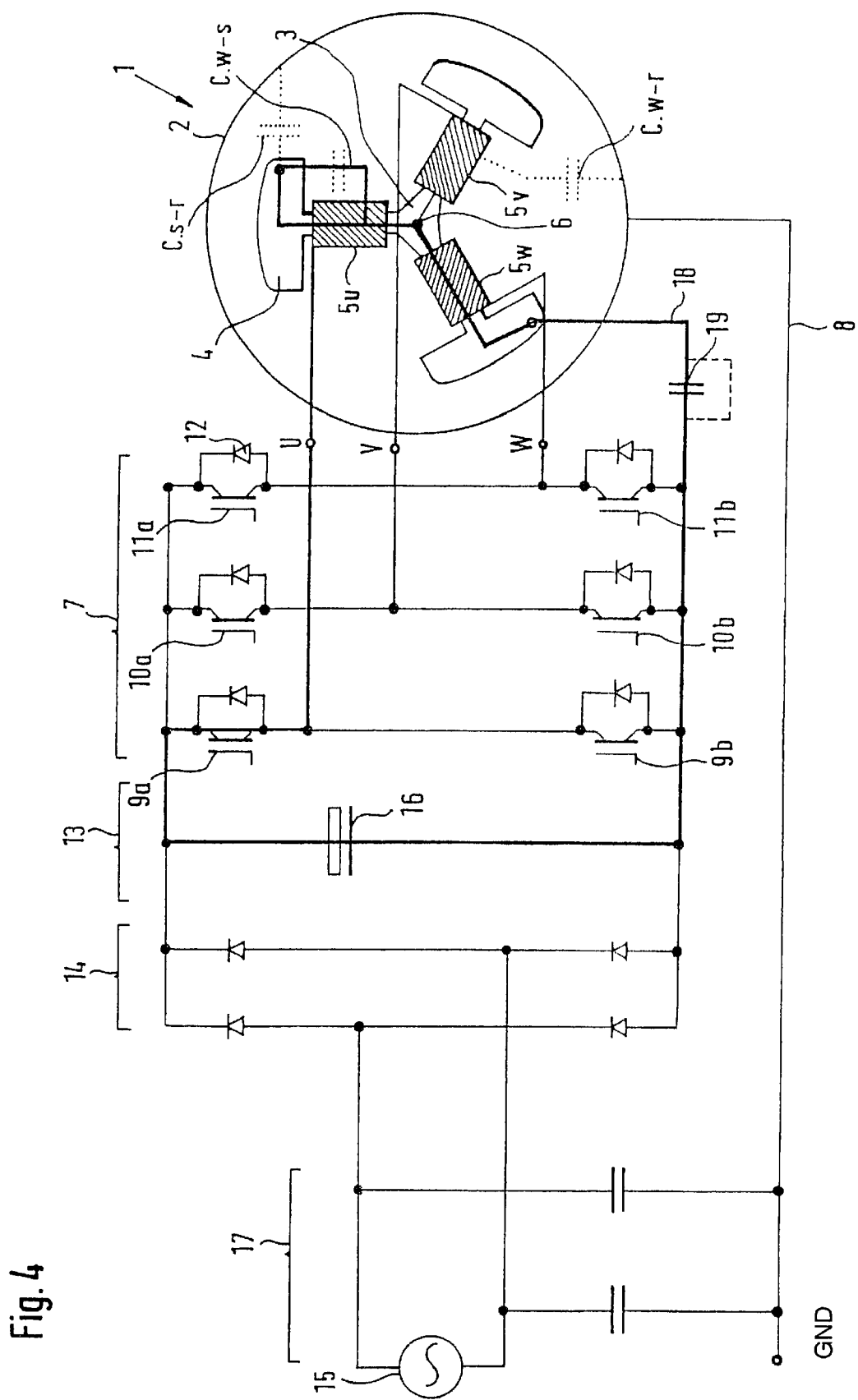
FIG. 4 illustrates the circuitry for the shunting of the disruptive or leakage current pursuant to FIG. 3 already prior to the entry thereof into the protective conductor.

Pursuant to FIG. 4, the high-frequency currents no longer flow from the field windings 5 (in contrast with the conditions encountered in FIG. 2) to any significant extent through the appliance support for the external rotor 2 into the protective conductor 8, but due to the lower electrical resistance of the pole pieces 4 of the motor stator 3, which are essentially already installed so as to be insulated relative to the appliance housing, but flow through the ohmic or capacitively electrical bypass or shunt line 18, 19 directly back to the intermediate circuit 13.

Inasmuch as resultingly, shunt or leakage currents no longer flow access the rotor support, the latter is protected and the appliance housing is held free from any dangerous disruptive voltages, so that in the household there is afforded a protection for persons and the maintaining of limits in leakage currents.

Even when in contrast with the representation of the drawings, the motor 1 which is installed in an insulated manner into the appliance housing does not possess an external rotor 2, which because of its support is on housing potential, but rather possesses an internal rotor in the stator 3, then pursuant to the present invention, the pick-up of the disruptive leakage current through the machine housing to the protector conductor 8 is avoided, in that the stator 3 of the motor by means of the connection 18–19 is short-circuited in a high-frequency mode, or directly to one pole of the direct-voltage intermediate circuit 13 ahead of the inverter 7.

While the invention has been particularly shown and described with respect to preferred embodiments thereof, it will be understood by those skilled in the art that the foregoing and other changes in form and details may be made therein without departing from the spirit and scope of the invention.

What is claimed is:

1. An inverter-fed three-phase electrical motor (1) for a household appliance which is grounded through a protective conductor (8), said motor being provided for the direct drive of washing machines; said motor including a pick-up for high-frequency currents originating from an actuation of said inverter (7) and conducting said currents to one pole of a D.C. voltage supply (13) for said inverter (7) through an ohmic or capacitive shunt path (18–19), said shunt path leading from a stator (3) of said motor which is installed electrically insulated into said household appliance and is not connected to the protective conductor (8).

2. An electrical motor as claimed in claim 1, wherein said D.C. voltage supply (13) comprises an intermediate circuit which is supplied from a rectified A.C. voltage source (15).

* * * * *